(12) United States Patent
Ma et al.

(10) Patent No.: US 10,295,748 B2
(45) Date of Patent: May 21, 2019

(54) MULTI-MODE INTERFERENCE COUPLER

(71) Applicant: Elenion Technologies, LLC, New York, NY (US)

(72) Inventors: Yangjin Ma, Brooklyn, NY (US); Michael J. Hochberg, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/034,796

(22) Filed: Jul. 13, 2018

(65) Prior Publication Data
US 2018/0335572 A1   Nov. 22, 2018

Related U.S. Application Data

(63) Continuation of application No. 15/651,454, filed on Jul. 17, 2017, now Pat. No. 10,048,443, which is a continuation of application No. 14/989,850, filed on Jan. 7, 2016, now Pat. No. 9,739,947, which is a continuation-in-part of application No. 14/754,306, filed on Jun. 29, 2015, now Pat. No. 9,557,486.

(51) Int. Cl.
*G02B 6/293*   (2006.01)
*G02B 6/42*    (2006.01)
*G02B 27/00*   (2006.01)
*G02B 6/28*    (2006.01)

(52) U.S. Cl.
CPC ....... *G02B 6/29344* (2013.01); *G02B 6/2813* (2013.01); *G02B 6/4225* (2013.01); *G02B 27/0012* (2013.01); *G02B 6/2935* (2013.01)

(58) Field of Classification Search
CPC .............. G02B 6/29344; G02B 6/2813; G02B 6/4225; G02B 6/2935; G02B 27/0012
USPC .......................................................... 385/14
See application file for complete search history.

(56) References Cited

U.S. PATENT DOCUMENTS

2014/0178005 A1* 6/2014 Zhang .................. G02B 6/2808
385/45

* cited by examiner

*Primary Examiner* — Jerry M Blevins
(74) *Attorney, Agent, or Firm* — Stratford Managers Corporation

(57) ABSTRACT

A multimode interference (MMI) coupler with an MMI region of curved edges, and a method of design and manufacturing by using a computerized optimization algorithm to determine a favorable set of segment widths for the MMI region for a predefined set of coupler design parameters.

20 Claims, 12 Drawing Sheets

MULTI-MODE INTERFERENCE COUPLER

CROSS-REFERENCE TO RELATED APPLICATIONS

This application is a continuation of U.S. patent application Ser. No. 15/651,454, filed Jul. 17, 2017, now allowed, which is a continuation of U.S. patent application Ser. No. 14/989,850, filed Jan. 7, 2016, now U.S. Pat. No. 9,739,947, which is a continuation-in-part of and claims priority to U.S. patent application Ser. No. 14/754,306, now U.S. Pat. No. 9,557,486, filed Jun. 29, 2015, each of which is hereby incorporated by reference herein in its entirety.

TECHNICAL FIELD

The present invention relates to optical multimode interference devices and particularly to a multimode interference coupler with a multimode region with curved edges for improved performance.

BACKGROUND

Multimode interference (MMI) couplers are used for a wide variety of applications in photonic integrated circuits (PICs) such as splitters, combiners, and multiplexers. These applications take advantage of the variability of the refractive index of MIMI material, which can be heated as a means of controlling its behavior.

As one of the basic MMI couplers, a 2×2 3 dB MMI coupler is a fundamental building block of photonic integrated circuits (PIC). FIG. 1A is a schematic diagram illustrating a conventional 3 dB 2×2 MMI coupler 100 having an MMI region 111 of a rectangular shape defined by a region length 112 equal to $L_{MMI}$ and a region width 114 equal to $W_{MMI}$. The coupler 100 may be terminated by two pairs of ports at opposite ends of the MMI region 111, one input pair of a first port 101 and a second port 102 at a first end 113 of the MMI region 111, and another pair of third port 103 and fourth port 104 at a second end 115 of the MMI region 111. The operating principle of such a coupler is defined by well-known MMI self-imaging theory. When a single-mode optical signal is launched at either the first port 101 or the second port 102, the 2×2 coupler 100 behaves as a 3 dB power splitter, such as a Y-junction. Under such behavior, the single-mode optical signal propagates through the MMI region 111, resulting in two imaging mode optical signals with a 90-degree phase difference to emerge, one at each of the third port 103 and the fourth port 104. This 90-degree phase difference between the two output ports is an attractive feature in many applications such as broadband switches and coherent communications. The broadband wavelength response also makes the 2×2 MMI coupler 100 a better candidate for directional 3 dB couplers. Each pair of ports (101 and 102) or (103 and 104) at either end of the MMI region 111 is spaced apart by a port gap 117 equal to $D_{gap}$. According to MMI self-imaging theory, $D_{gap}$ must at least be equal to $\frac{1}{4}W_{MMI}$. In conventional prior art practice, the region width $W_{MMI}$ and the region length $L_{MMI}$ are tuned when designing the 2×2 MMI coupler 100 by finding a self-imaging point that meets a specific desired performance FIG. 1B illustrates another configuration of a prior art rectangular K×M MMI coupler 200 with a rectangular MMI region 211 for applications requiring more than two ports at either a first end 213 or a second end 215 of the MMI region 211. The coupler 200 is terminated by a first set of K ports 201 at the first end 213, and a second set of M ports 202 at the second end 215, where K and M are integers greater than 0. The K×M coupler 200 follows similar operating principles to those known for the 2×2 coupler 100 shown in FIG. 1A.

With reference to FIG. 1C, trapezoidal coupler geometry is also conventionally used for the MMI region 311. FIG. 1C illustrates a K×M MMI coupler 300 with a trapezoidal MMI region 311 terminated by a first set of K ports 301 at a first end 313 thereof, and by a second set of M ports 302 at a second end 315 thereof, where K and M are greater than 1. The port positioning in trapezoidal couplers is conventionally determined by the self-imaging theory disclosed by Soldano, Lucas B., and Erik Pennings, in a paper entitled "Optical multi-mode interference devices based on self-imaging: principles and applications" published in Lightwave Technology, Journal of 13.4, 1995, pages 615-627, which is incorporated herein by reference.

Performance of the aforementioned prior art couplers, in terms of metrics, such as insertion losses, phase error and bandwidths, can be tuned only by modifying the width value $W_{MMI}$ and length value $L_{MMI}$, thus leaving little room for design flexibility, in view of the fixed geometry of rectangular and trapezoidal MMI regions. Furthermore, rectangular and trapezoidal MMI region geometries disadvantageously introduce excess loss when coupling light out of the MMI region into a waveguide. In addition, the geometry and symmetry properties of the MMI region are susceptible to significant deviations from the intended dimensions as a result of variations in the fabrication process from run to run or even from wafer to wafer in lithography, etching, wafer thickness, and the like, thereby undermining the power balance and increasing the phase error of an optical signal propagating through the MMI region.

Accordingly, there is a need for more flexibility in MMI coupler geometry, providing additional features that can be configured for improving performance, in terms of lower insertion loss, power imbalance, phase error, and wider broadband performance, while maintaining a small footprint suitable for large-scale photonic integration.

SUMMARY OF THE INVENTION

Accordingly, the present invention relates to a multimode interference coupler comprising: a multimode interference (MMI) region including: first and second region ends separated by a region length along a longitudinal axis, and first and second curved edges between the first and second region ends, defining the MMI region, which varies in width along the region length; at least one port optically coupled to the first region end; and at least one port optically coupled to the second region end; wherein each of the first and second curved edges includes a plurality of transitions, and varies in slope relative to the longitudinal axis on each side of each transition; wherein the MMI region includes a plurality of different widths, perpendicular to the longitudinal axis, each width corresponding to one of the plurality of transitions, spaced apart along the region length, defining adjacent segments; and wherein the first and second curved edges provide gradual transitions between the different widths.

Another aspect of the present invention relates to a method of manufacturing a multimode interference (MMI) coupler comprising: a multimode interference (MMI) region including: first and second region ends separated by a region length along a longitudinal axis, and first and second curved edges between the first and second region ends, defining the MMI region, which varies in width along the region length, each of the first and second curved edges including a plurality of transitions and varying in slope relative to the longitudinal axis on each side of each transition; at least one port optically coupled to the first region end; and at least one port optically coupled to the second region end, said method comprising: determining the first and second curved edges for a predefined set of design parameters, using a computerized optimization algorithm; and fabricating the MMI coupler with the first and second edges.

BRIEF DESCRIPTION OF THE DRAWINGS

The invention will be described in greater detail with reference to the accompanying drawings, which relate to preferred embodiments thereof, wherein.

The drawings are not necessarily to scale, emphasis instead generally being placed upon illustrating the principles of the invention. In the drawings, like numerals are used to indicate like parts throughout the various views.

DETAILED DESCRIPTION

Figure 2A:
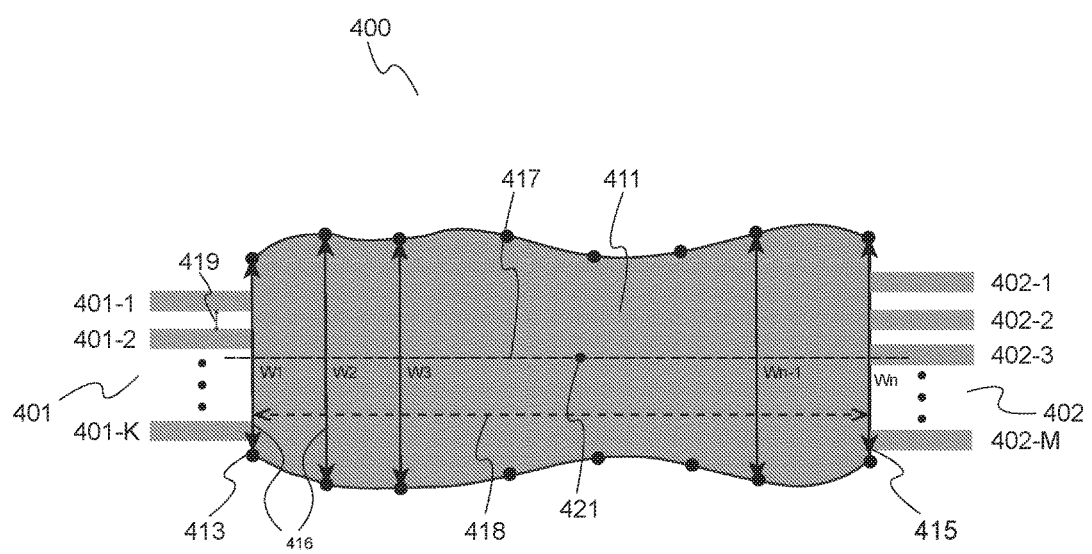
FIG. 2A is a schematic diagram illustrating a K×M MMI coupler with a segmented geometry in accordance with an embodiment of the present invention.

A list of acronyms and their usual meanings in the present document (unless otherwise explicitly stated to denote a different thing) are presented below.
CMOS Complementary Metal-Oxide-Semiconductor
FDTD Finite Difference Time Domain
FOM Figure of Merit
GaAs Gallium Arsenide
InP Indium Phosphide
MZI Mach Zehnder interferometer
PIC Photonic Integrated Circuits
PSO Particle Swarm Optimization
SiN Silicon nitride
SOI Silicon on Insulator FIG. 2A illustrates a schematic diagram of a K×M MMI coupler 400 in accordance with an embodiment of the present invention. The MMI coupler 400 comprises an MMI region 411 optically coupled to a set of K (input) ports $401_1$ to $401_K$ at a first end 413 thereof, and to M (output) ports $402_1$ to $402_M$ at a second end 415 thereof opposite to the first end 413. Each of K and M can have any integer value greater than zero. Each of the K ports 401 and the M ports 402 may have a respective outer port side for optical coupling to an optical waveguide (not shown). Each pair of adjacent input and output ports 401 and 402 is separated by a port gap 419 with a value of $D_{gap}$. The first and second ends 413 and 415 are separated by a region length 418 equal to $L_{MMI}$, and may be perpendicular to a longitudinal (propagation) axis 417 of the MMI region 411. The MMI region 411 may have a segmented geometry along the longitudinal axis 417 to allow more design freedom for improving MMI coupler performance. The segmented geometry can be achieved with N different, spaced apart segment widths 416 with respective widths $W_1, W_2, W_3, \ldots, W_{N-1}, W_N$ perpendicular to longitudinal axis 417. The segment widths 416 define two curved or wavy edges, a first (upper) edge 412 and a second (lower) edge 414, for the MMI region 411 between the first and second ends 413 and 415. For easier fabrication mask preparation, the shape of each of the first and second edges 412 and 414 may be smoothed to include a plurality of peaks and valleys with a variability limited to a range of +/−20 to +/−50% of average width, +/−5% to +/−50% of average width, +/−10% to +/−25% of average width, or +/−10 to +/−15% of average width.

In order to meet a desired performance requirement for the MMI coupler 400, the segment widths 416 may be spaced apart equally or unequally along the longitudinal axis 417, the respective segment widths 416 may be symmetrically or asymmetrically arranged on either side of a midpoint 421 of the longitudinal axis 417, and the first and second edges 412 and 414 may be symmetrical or asymmetrical to each other about the longitudinal axis 417. The number N of segment widths 416 may be limited to what is permissible by mask resolution of a fabrication process and/or by computational requirements of the software and hardware utilized to determine the segment widths. Typical values of N for most material fabrication, e.g. 220 nm thick silicon on insulator (SOI), of semiconductor layers may range between 8 and 20 segment widths, which may be spaced apart by 0.5 μm to 2 μm, preferably about 1 μm apart, and may have a region length 418 of between 6 μm and 12 μm. Higher values of N may be chosen for higher values of $L_{MMI}$.

The performance of the MMI coupler 400 can be improved by a method of design and manufacturing that determines a favorable set of segment widths 416 $W_1, W_2, W_3, \ldots, W_{N-1}, W_N$ corresponding to a predefined set of design parameters including values of K, M, N, $L_{MMI}$, $D_{gap}$, semiconductor layer composition for fabricating the MMI coupler 400, and operational wavelength band for the MMI coupler 400. The semiconductor composition can be selected from conventional compositions, such as silicon on insulator (SOI), silicon nitride (SiN), indium phosphide (InP) or gallium arsenide (GaAs). The operational wavelength band can be chosen from one or more of O band, E band, S band, C band, L band, and U band. A value for $D_{gap}$ may be assigned to exceed minimum foundry requirement, by a percentage such as 20%.

Accordingly, a step-by-step method of determining the favorable set of N segment widths 416 for $W_1, W_2, W_3, \ldots, W_{N-1}, W_N$, is described in detail herein by implementing a computerized algorithm, such as a genetic optimization algorithm or a particle swarm optimization (PSO) algorithm.

In a first step, an initial region width $W_{MMI}$ may be defined to be equal to at least the summation of respective widths of the outer port sides of the K ports $401_1$ to $401_K$ plus the summation of predefined values of the port gaps 419, i.e. $(K-1) \times D_{gap}$. A value for $L_{MMI}$ can be determined to equal a length of a conventional, e.g. rectangular, MIMI region of a width equal to $W_{MMI}$ according to conventional, e.g. MMI self-imaging, requirements. Subsequently, a widths range for $W_1, W_2, W_3, \ldots, W_{N-1}, W_N$ can be defined to approximate $W_{MMI}$ within a margin of up to +/−50% of the initial region width, preferably +/−30% of the initial region width, and more preferably +/−20% of the initial region width.

In a second step, the computer algorithm can select, e.g. by a randomization process, a set of interim widths for the plurality of segment widths 416. First and second interim edges are then generated by smoothing, e.g. interpolating, the sections of the first and second interim edges between the segment widths 416. A computer simulation is then performed for an MMI coupler corresponding to the set of interim widths, the first and second edges, and the aforementioned predefined set of design parameters, in order to determine the output optical powers at the M ports $402_1$ to $402_M$ relative to a predefined input optical power at an input port $401_i$ preselected from the K ports 401. The second step may be repeated until a figure of merit (FOM) exceeds a predefined performance limit for a working set of interim widths. The FOM may be any parameter, difference in parameters or ratio of parameters, such as output optical power reading at one or both of the M ports 402, a ratio of the two output optical power readings, a ratio of input to output optical power readings, a difference between input power and total output power etc.

The ends of the resulting segment widths 416 define points for mapping the first and second edges 412 and 414. The points may then be joined by interpolation and/or smoothing techniques to form a template, from which the first and second edges 412 and 414 may be formed. Because of the plurality of different lengths of the widths 416, the first and second edges include a plurality, preferably more than three, of transitions in the slope of the first and second edges 412 and 414 relative to the longitudinal axis in the X-Y plane, excluding any intersection with the first and second ends 413 and 415. The transitions may take the form of a change in curvature, i.e. the second derivative of the slope equals 0, and/or the transitions may take the form of a critical point, i.e. the first derivative of the slope equals 0 and a tangent is parallel to the longitudinal axis. Typically the first and second edges 412 and 414 have varying slopes relative to the longitudinal axis on either side of the transition, resulting in undulating boundaries with a plurality of peaks, a plurality of valleys, and/or a plurality of peaks and valleys, preferably two or more each and three or more total, corresponding to the critical points along the entire length of each of the first and second edges 412 and 414. Some of the points formed by the specific ends of the segment widths 416 define the local minima or maxima, i.e. when the end of the segment width is between two other widths, which are both wider or both narrower resulting in a transition between positive and negative slopes relative to the longitudinal axis. Alternatively, the points may be simply a transition point, i.e. when the end of the segment width is between two other widths, in which one is narrower and one is wider.

Accordingly, an additional step may include smoothing the plurality of peaks and valleys in the first and second edges 412 and 424 using a computerized interpolation algorithm to ensure the peaks and valleys are rounded and curved rather than sharp transitions. Subsequently, such smoothed working set of the interim widths can be set as the working set of segment widths 416. Accordingly, each MMI region 411 is divided into segments defined at each region end by adjacent segment widths $W_1$ or $W_N$, and at each edge by curved and smoothed out sections of the first and second wavy edges 412 and 414.

Figure 1A:
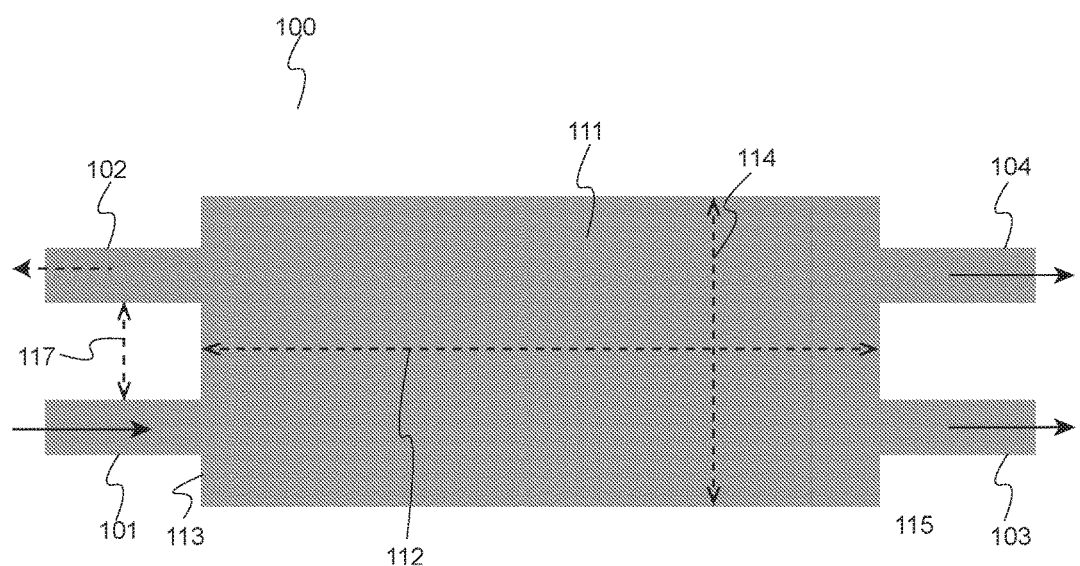
FIG. 1A is a schematic diagram of a rectangular 2×2 MMI coupler.
Figure 1B:
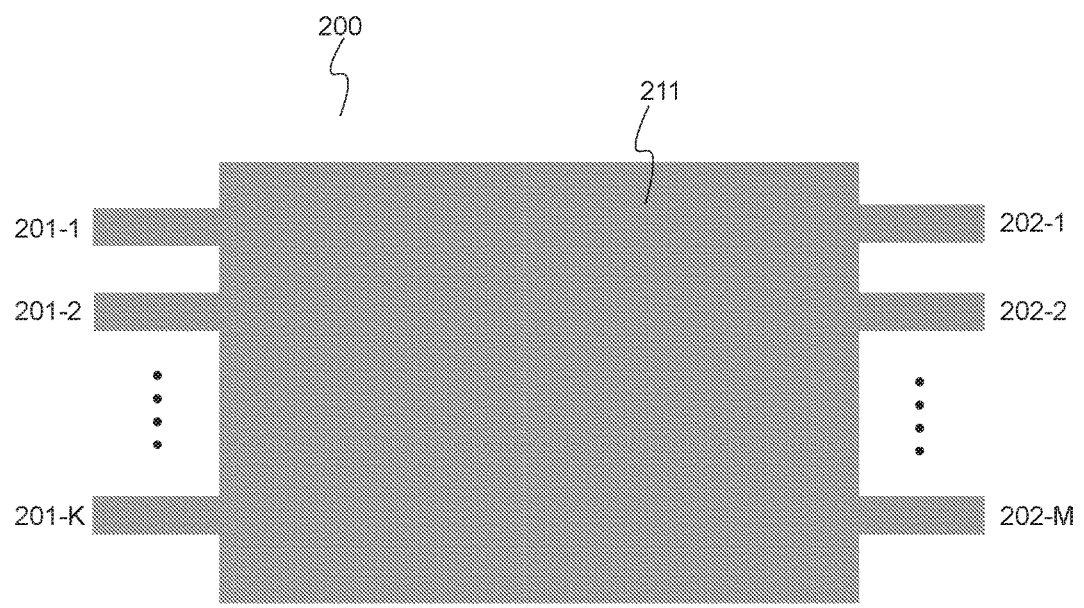
FIG. 1B is a schematic diagram of a rectangular K×M coupler.
Figure 1C:
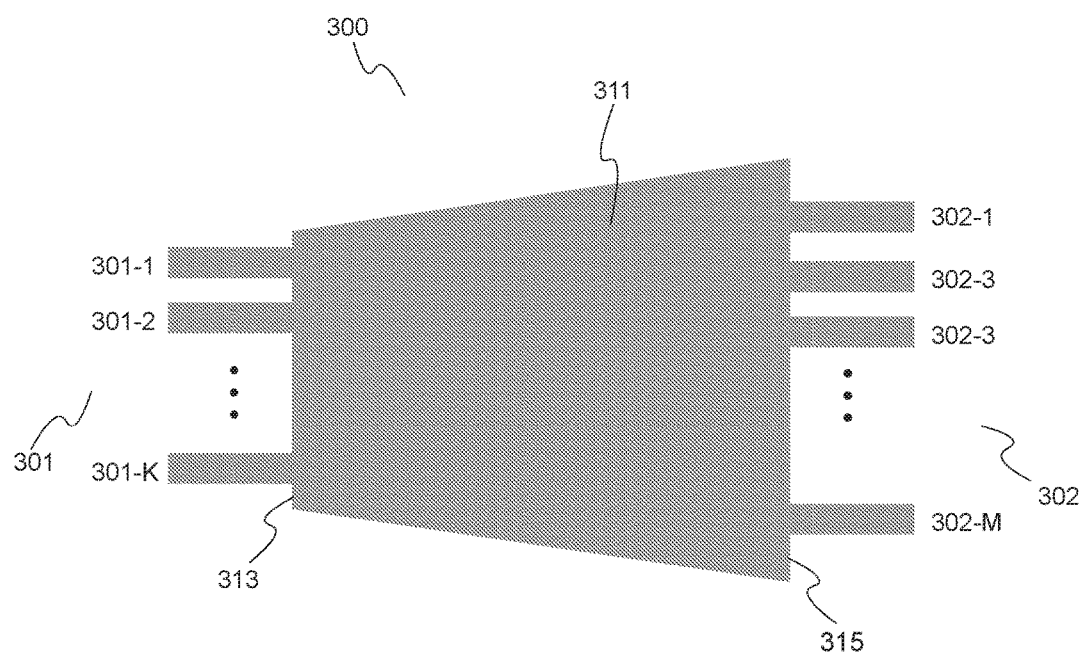
FIG. 1C is a schematic diagram of a trapezoidal K×M coupler.
Figure 2B:
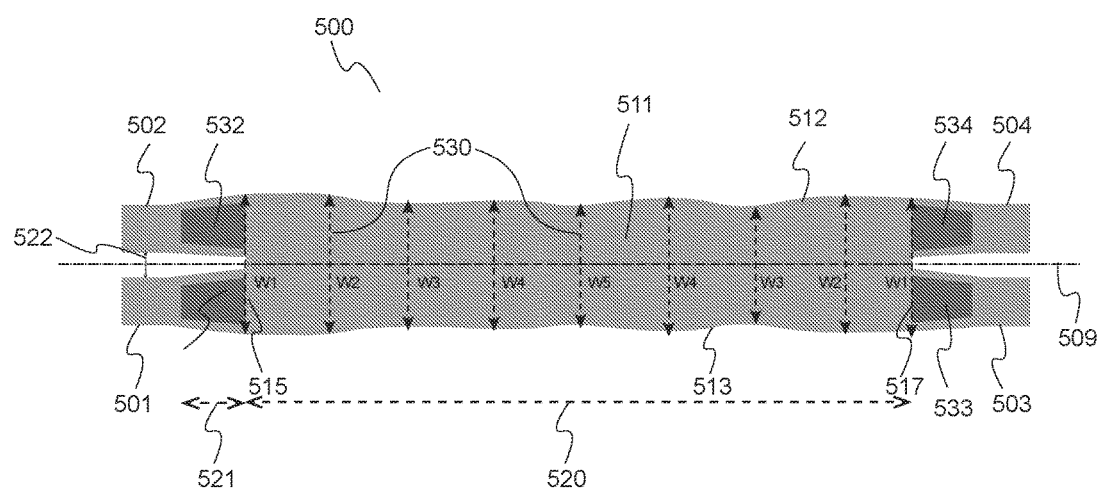
FIG. 2B is a schematic diagram illustrating a 2×2 MMI coupler in accordance with another embodiment of the present invention.

To provide a practical example of performance improvement achievable for the coupler 200 illustrated in FIG. 1B in accordance with the present invention, a set of design parameters can be predefined for an exemplary embodiment of a coupler 500, as illustrated FIG. 2B, wherein K=M=2 and N=9 thereby giving a 2×2 3 dB MMI coupler 500 with two input ports (first and second ports 501 and 502) with outer port sides spaced apart by a port gap 522 equal to $D_{gap}$, two output ports (third and fourth ports) 503 and 504, and nine segments widths 530 equally spaced apart by a distance $L_{MMI}/8$ along longitudinal axis 509 of an MIMI region 511. The nine segment widths 530 define two curved or wavy edges 512 and 513 for the MMI region 511 between a first region end 515 optically coupled to the first and second ports 501 and 502, and a second region end 517 optically coupled to the third and fourth ports 503 and 505. An optical power fed into any one of the two input ports 501 and 502, may be substantially split evenly between the two output ports 503 and 504. Respective widths of the nine width segments 530 may be symmetrically arranged about a midpoint of the longitudinal axis 509 to form a corresponding set of nine segment widths $W_1, W_2, W_3, W_4, W_5, W_4, W_3, W_2$, and $W_1$. Such geometric symmetry may allow the MMI coupler 500 to operate similarly in either direction with interchangeable input port 501 and 502 and output ports 503 and 504. Shapes of the two curved edges 512 and 513 may include a plurality of peaks and valleys and may be symmetrical to each other about the longitudinal axis. For a more efficient guiding of the optical mode and for more smoothly transforming input/output mode profiles, each of the first, second, third and fourth ports 501, 502, 503, and 504 may include a relatively short respective tapered section 531, 532, 533 and 534 bordering the MMI region 511, with a taper length 521 equal to $L_{taper}$, a first taper width bordering the nonlinear MMI region and a second taper width at the outer port side narrower than the first taper width.

The aforementioned method of design and manufacturing can be applied in a similar way to the embodiment of FIG. 2B, in order to determine a final set of nine, i.e. five different, segment widths for $W_1, W_2, W_3, W_4, W_5, W_4, W_3, W_2$, and $W_1$. The predefined design parameters can be further defined, wherein the semiconductor composition is silicon on insulator (SOI) with a semiconductor layer thickness of 220 nm, the operational wavelength is from C band, $L_{MMI}$=8 µm, $D_{gap}$=0.2 µm, and the design figure of merit (FOM) equals sum of the two output powers $P_1$ at the third port 503 and $P_2$ at the fourth port 504 minus absolute difference between the two output powers $P_1$ and $P_2$, namely FOM=$P_1$+$P_2$−abs($P_1$−$P_2$). Applying a particle swarm optimization (PSO) algorithm to the aforementioned set of design parameters may provide the segment widths shown in table 1 herein.

TABLE 1

|  | $W_1$ | $W_2$ | $W_3$ | $W_4$ | $W_5$ |
|---|---|---|---|---|---|
| Segment Width in µm | 1.60 | 1.59 | 1.45 | 1.50 | 1.44 |
| Distance in µm from the MMI region first or second end | 0 | 1 | 2 | 3 | 4 |

For further performance improvement of the present exemplary embodiment illustrated in FIG. 2B, a favorable set of dimensions can be defined for the four tapered sections 531, 532, 533, and 534 by conventional methods, which may determine the first taper width to be equal to 0.7 µm, the second taper width to be equal to 0.5 µm, and the taper length to be equal to 1.0 µm. A computer simulation of a 2×2 MMI coupler with the aforementioned dimensions and design parameters may provide an FOM=0.985. Further results of the computer simulation may give the results shown in FIGS. 3, 4 and 5 for electrical field propagation, insertion loss, and phase error respectively.

Figure 3:
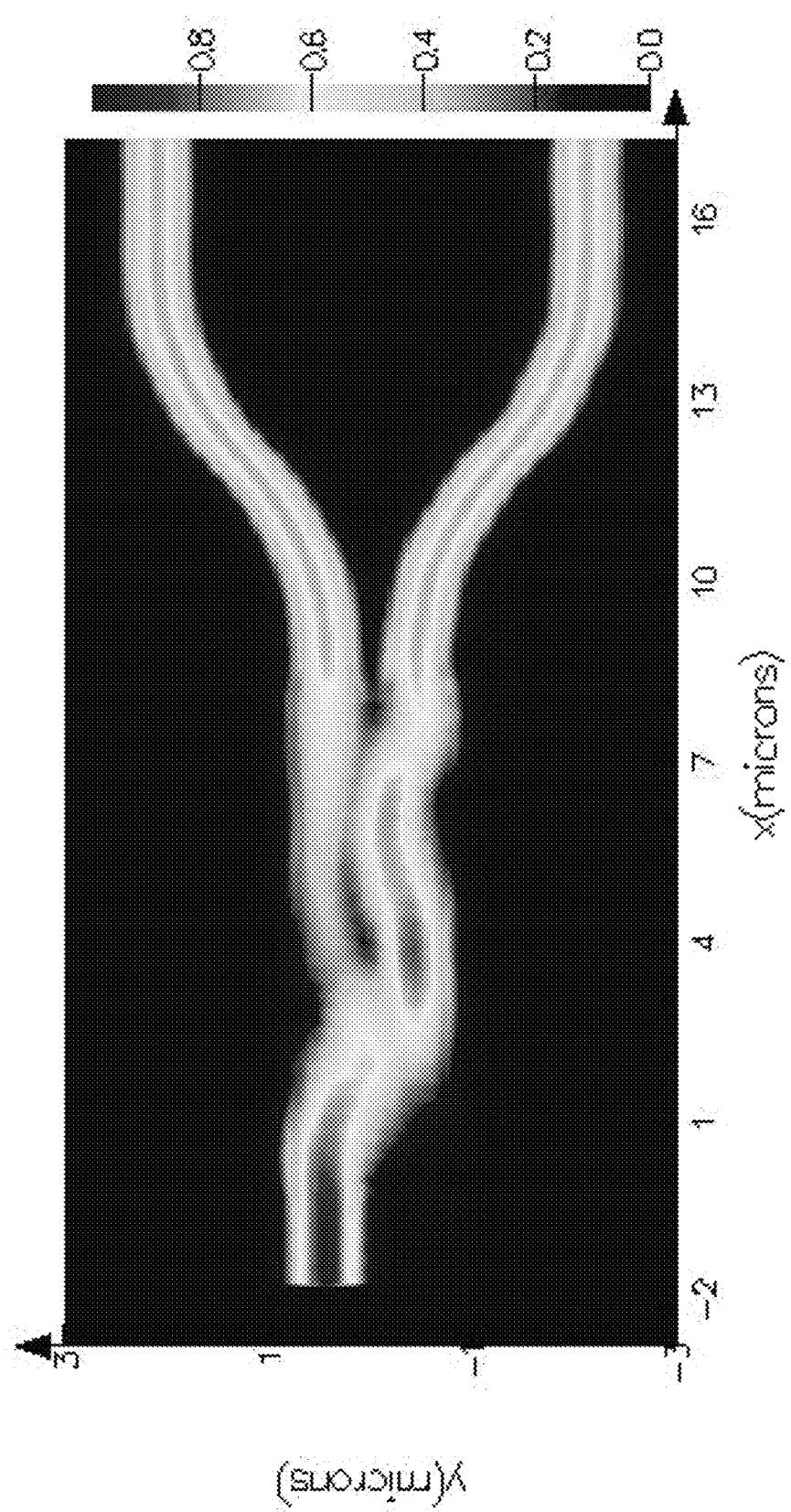
FIG. 3 is a graph showing simulated electrical field propagation in the MMI coupler illustrated in FIG. 2B.

FIG. 3 shows simulated electrical field propagation from the first (left) end 515 of the coupler 500 illustrated in FIG. 2B to the second (right) end 517 thereof, using a finite difference time domain (FDTD) model. As is clearly seen from FIG. 3, the amplitude of the electrical field at the left end 515 is evenly distributed at the right end 517 with negligible scattering loss, thereby demonstrating an advantage over conventional 2×2 MMI couplers.

Figure 4:
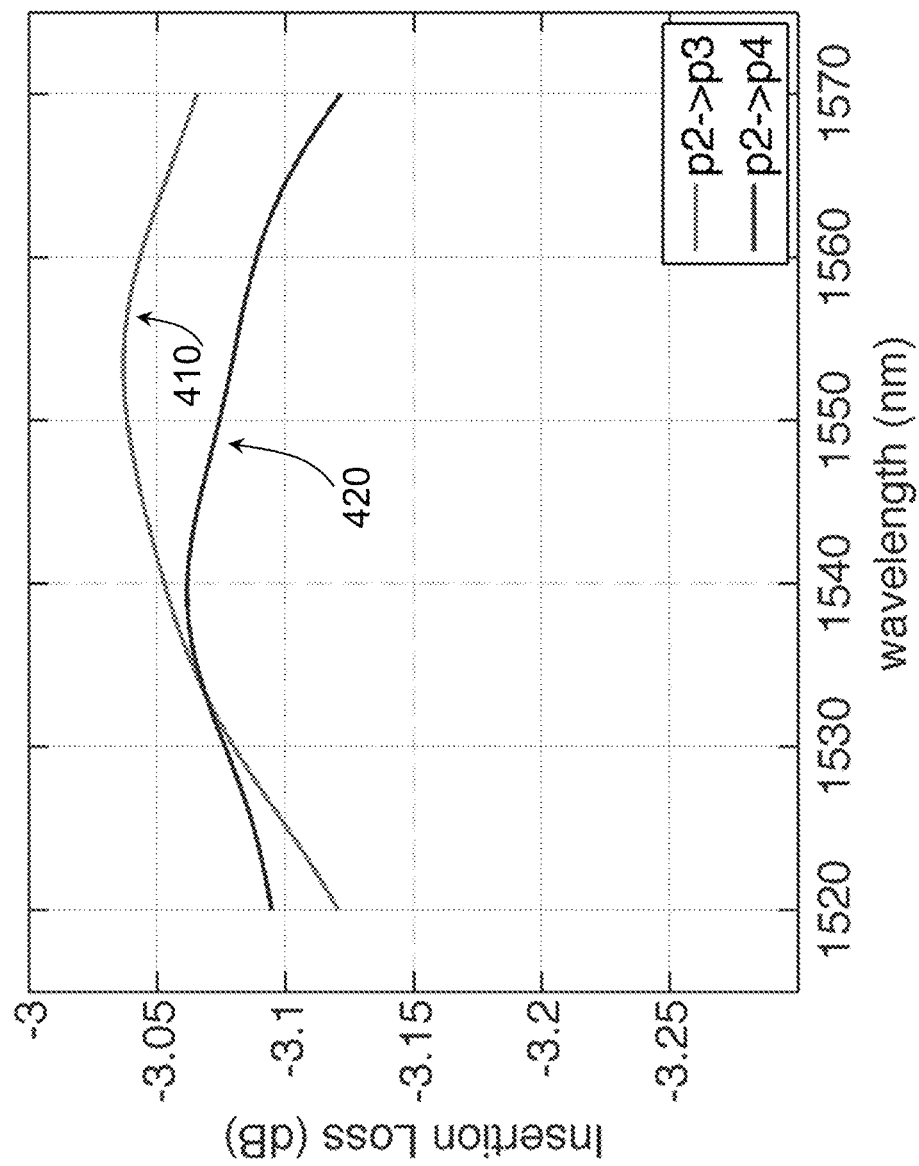
FIG. 4 is a graph showing simulated insertion loss for the MMI coupler illustrated in FIG. 2B.

FIG. 4 shows simulated insertion loss of the MMI coupler 500 illustrated in FIG. 2B for a C band wavelength range, relative to an input optical signal at the second port 502 (p2). In FIG. 4, a curve 410 shows the insertion loss at the third port 503 (p3), and curve 420 shows the insertion loss at the fourth port 504 (p4). A similar insertion loss is anticipated for an input optical signal at the first port 501 (p1) instead of the second port 502 (p2). Over the entire wavelength range shown in FIG. 4, the excess loss, beyond the ideal insertion loss of 3 dB, in either third or fourth port (p3 or p4), ranges between 0.04 dB and 0.13 dB, and approximately averages to 0.07 dB. The results of FIG. 4 demonstrate a favorable balance between the third and fourth ports branches with less than 0.1 dB difference. The MMI coupler 500 also provides favorable broadband performance, with less than 0.1 dB variation across the entire C-band wavelength range.

Figure 5:
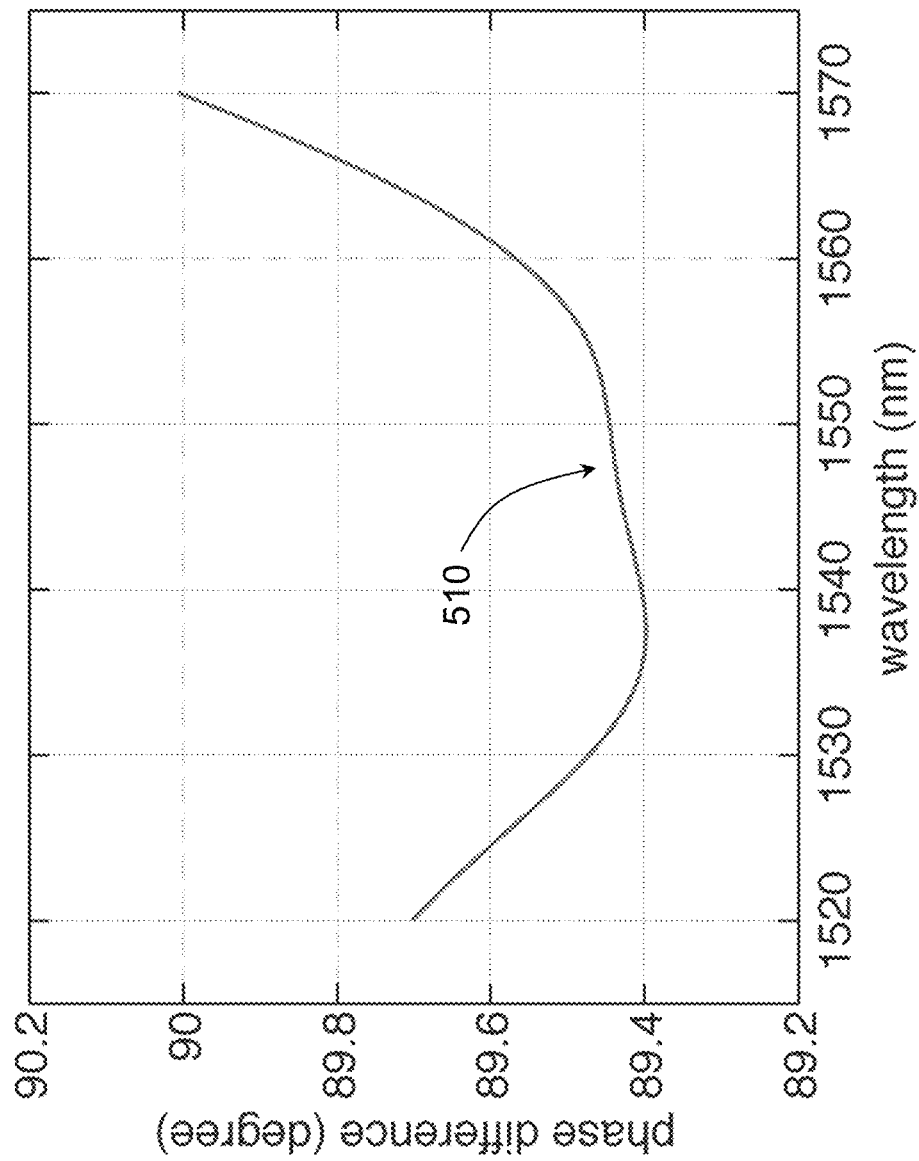
FIG. 5 is a graph showing simulated phase error for the MMI coupler illustrated in FIG. 2B.

FIG. 5 shows simulated phase error simulation for the MMI coupler 500 illustrated in FIG. 2B for a C band wavelength range. As seen from FIG. 5, phase difference between an input and an optical signal is favorably close to the ideal difference of 90-degree, within an error of less than 0.6 degree across the entire C-band wavelength range, thereby demonstrating an advantage over conventional 2×2 MMI couplers.

Figure 6:
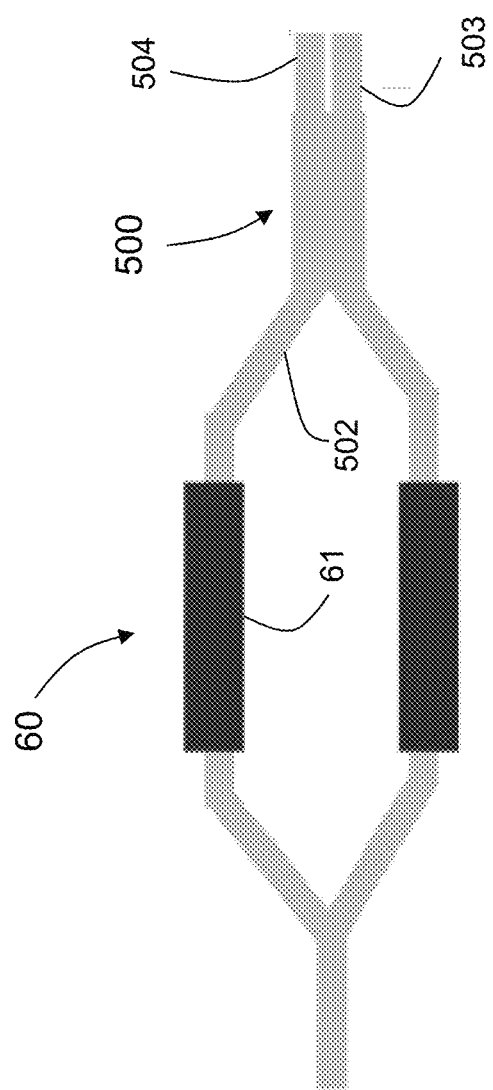
FIG. 6 is a schematic diagram illustrating a test structure comprising a Mach Zehnder interferometer comprising a phase tuner used to drive the MMI coupler illustrated in FIG. 2B.

To perform experimental tests on a 2×2 MMI coupler 500 as illustrated in FIG. 2B and fabricated with the aforementioned characteristics, a test structure 60 as illustrated in FIG. 6 can be used to drive the MMI coupler 500. The test structure 60 can include a Mach Zehnder interferometer (MZI) 60 comprising a phase tuner 61 for measuring power imbalance and phase error of the MMI coupler 500 from the MZI spectrum extinction ratio.

Figure 7:
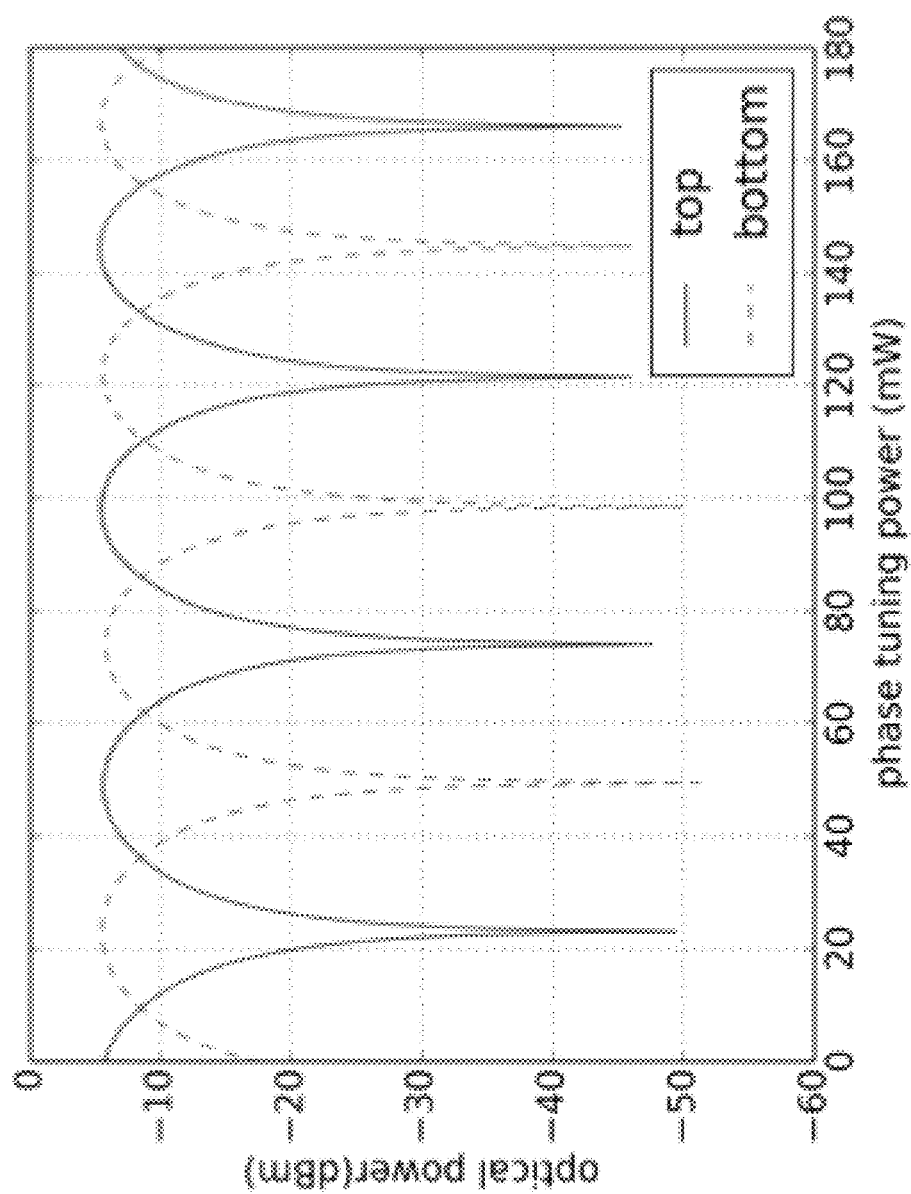
FIG. 7 is a graph showing optical power as a function of phase tuning power in each of the two output ports of the MMI coupler illustrated in FIGS. 2B and 6.

FIG. 7 is a graph of the optical power in each of the third (bottom) port 503 and fourth (top) port 504 of the MMI coupler 500 illustrated in FIGS. 2B and 6 as a function of phase tuning power at the second port 502. As seen from FIG. 7, the extinction ratio is about 45 dB for both top and bottom ports, indicating a power imbalance of approximately 0.1 dB. By comparing phases of the top and bottom ports, the measured phase error is approximately 1 degree.

Figure 8:
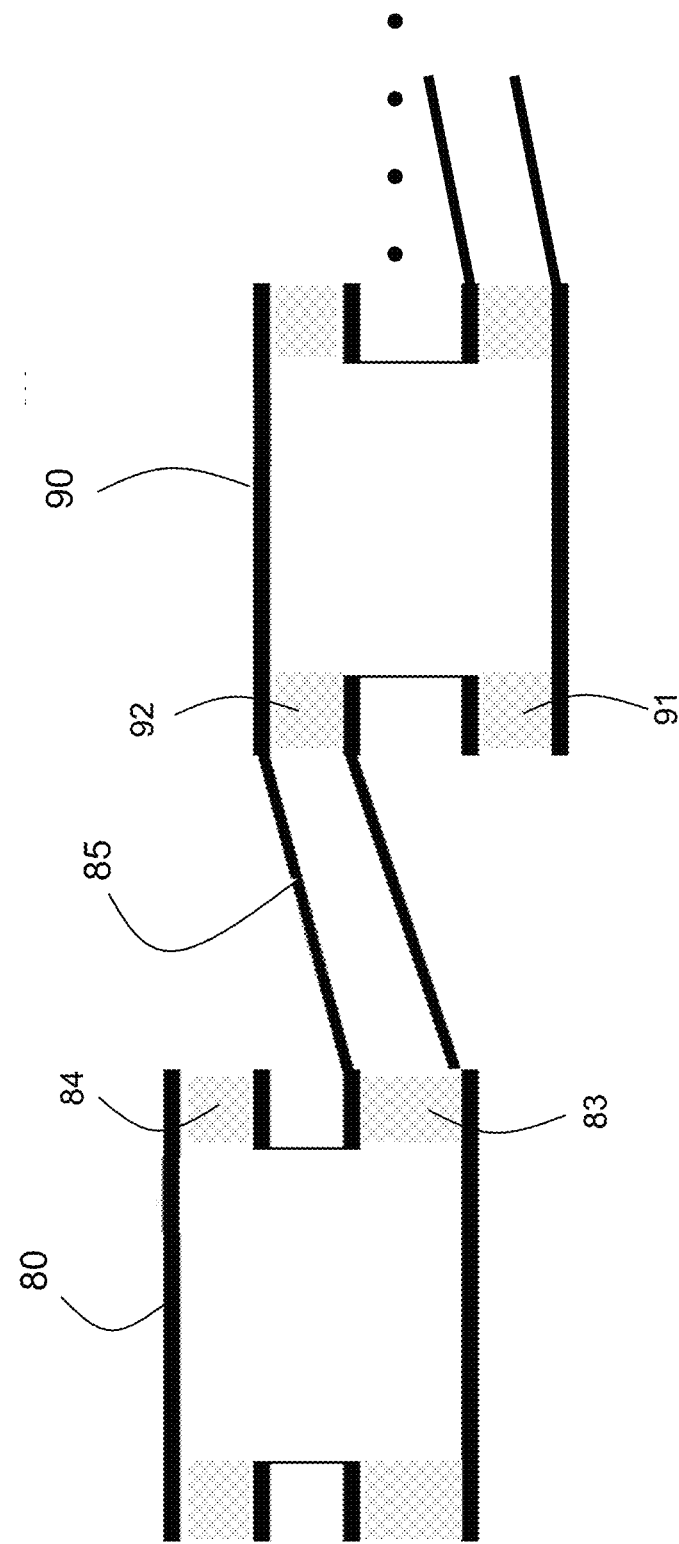
FIG. 8 is a schematic diagram illustrating an arrangement for measuring coupler power loss by cascading a number of 2×2 MMI couplers as illustrated in FIG. 2B.

Insertion loss of a 2×2 MMI coupler can be more accurately determined by cascading a number of similar couplers optically coupled in a tandem arrangement as illustrated in FIG. 8, measuring a combined loss of the cascaded couplers and dividing the measured combined loss by the number of cascaded couplers. Such cascaded structures can provide a test structure for being embedded in the spare space of a large-scale integrated system to enable MMI device characterizations in a wafer scale fabrication.

As illustrated in FIG. 8, a first 2×2 MMI coupler 80 including lower and upper output ports 83 and 84, respectively, can be cascaded with a second 2×2 MMI coupler 90 including lower and upper input ports 91 and 92, respectively. In the cascading arrangement illustrated in FIG. 8, the lower output port 83 may be in optical communication with the upper input port 92 via an optical carrier 85, which can be an optical waveguide. Alternatively, the lower output port 83 and the upper input port 92 can be positioned sufficiently close to each other to be in direct optical communication. In another cascading arrangement, the upper output port 84 can be directly connected to the upper input port 92, with port 83 connected to port 91 in the meanwhile. The arrangement illustrated in FIG. 8 can be replicated to cascade as many additional couplers as required, by providing optical communication between a lower output of any cascaded coupler and an upper input port of a next successive coupler.

Figure 9:
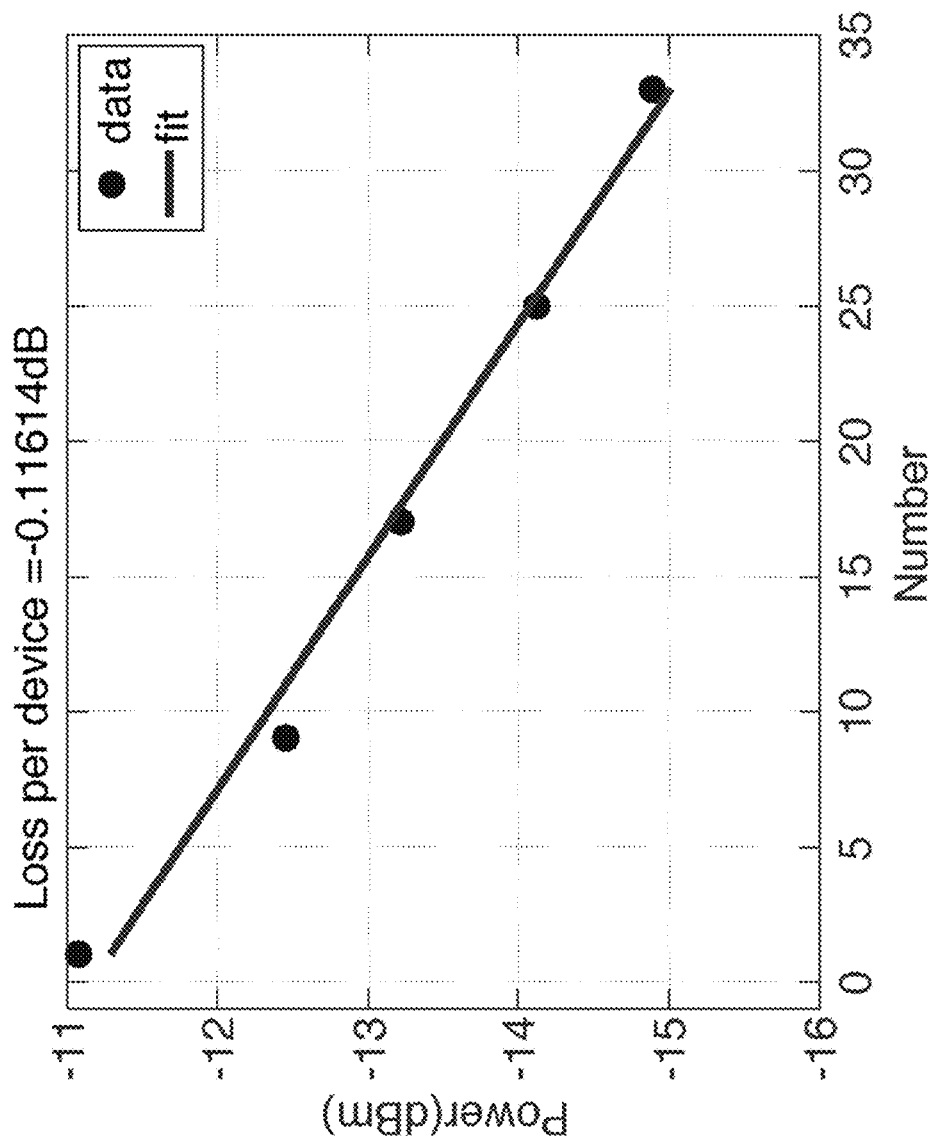
FIG. 9 is a graph showing measured power loss data and a regression line fitting the data versus number of couplers in the cascaded arrangement illustrated in FIG. 8.

FIG. 9 is a graph showing measurement data and a regression line to fit the measurement data for the loss in delivered power at a wavelength around 1550 nm in a set of cascaded couplers as shown in FIG. 8, versus number of the cascaded couplers. The regression line indicates an average measured loss in delivered power per a single coupler of approximately 0.11 dB.

The aforementioned results demonstrate, in combination, that within a footprint of 9.4×1.6 µm$^2$, less than 0.1 dB power imbalance, less than 1 degree phase error and less than 0.2 dB excess optical loss can be achieved across the entire C-band. This indicates that a 2×2 MMI designed and manufactured in in accordance with the present invention, promises an improved performance in terms of power loss, power balance, and phase error.

In general, K×M MMI couplers with greater than 2 values for K, M or both K and M, can be designed and fabricated for an improved performance by a direct extension of the aforementioned methods and principles described for the 2×2 MMI coupler embodiment of the present invention.

Although experimental results are described herein for a wavelength range related to conventional C band, an MMI coupler can be designed, constructed, simulated and subjected to experimental measurements for other wavelength ranges selected from the group of O band, E band, S band, L band, and U band listed in Table II herein, in accordance with the aforementioned principles and methods.

TABLE II

| Band | Description | Wavelength Range |
|---|---|---|
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

While the present invention has been particularly shown and described with reference to the preferred mode as illustrated in the drawing, it will be understood by one skilled in the art that various changes in detail may be affected therein without departing from the spirit and scope of the invention as defined by the claims.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

We claim:

1. A multimode interference coupler comprising:
a multimode interference (MMI) region including:
first and second region ends separated by a region length along a longitudinal axis, and
first and second edges between the first and second region ends defining the MMI region, which varies in width along the region length;
wherein each of the first and second edges includes at least three critical points in slope relative to the longitudinal axis defining at least three local minima or maxima;
at least one port optically coupled to the first region end; and
at least one port optically coupled to the second region end;
wherein the at least three local minima or maxima comprises at least three maxima and at least two minima in each of the first and second edges; wherein a first derivative of a slope of the first and second edges at each local minima or maxima relative to the longitudinal axis is substantially 0.

2. The coupler according to claim 1, wherein the MMI region includes a plurality of different segment widths, perpendicular to the longitudinal axis, each segment width corresponding to one of the critical points, spaced apart along the region length, defining adjacent segments; and wherein the first and second edges provide gradual transitions between the different widths.

3. The coupler according to claim 2, wherein the plurality of different widths corresponds to 5 to 20 local maxima and minima spaced along each of the first and second edges.

4. The coupler according to claim 2, wherein the plurality of different widths are equally spaced along the longitudinal axis.

5. The coupler according to claim 4, wherein the plurality of different widths are symmetrical about a midpoint of the longitudinal axis.

6. A multimode interference coupler comprising:
a multimode interference (MMI) region including:
first and second region ends separated by a region length along a longitudinal axis, and
first and second edges between the first and second region ends defining the MMI region, which varies in width along the region length;
wherein each of the first and second edges includes at least three critical points in slope relative to the longitudinal axis defining at least three local minima or maxima;
at least one port optically coupled to the first region end; and
at least one port optically coupled to the second region end;
wherein the at least three local minima or maxima comprises at least two maxima and at least three minima in each of the first and second edges; wherein a first derivative of a slope of the first and second edges at each local minima or maxima relative to the longitudinal axis is substantially 0.

7. A multimode interference coupler comprising:
a multimode interference (MMI) region including:
first and second region ends separated by a region length along a longitudinal axis, and
first and second edges between the first and second region ends defining the MMI region, which varies in width along the region length;
wherein each of the first and second edges includes at least three critical points in slope relative to the longitudinal axis defining at least three local minima or maxima;
at least one port optically coupled to the first region end; and
at least one port optically coupled to the second region end;
wherein each of the first and second edges also includes at least one transition point with a change in curvature as the width transitions from a wider width to a narrower width, wherein a second derivative of a slope of the first and second edges at the transition point equals relative to the longitudinal axis is substantially 0.

8. The coupler according to claim 7, wherein the at least three local minima or maxima comprises at least three maxima and at least two minima in each of the first and second edges; wherein a first derivative of a slope of the first and second edges at each local minima or maxima relative to the longitudinal axis is substantially 0.

9. The coupler according to claim 7, wherein each of the at least one port optically coupled to the first and second region ends comprises two ports, wherein the first and second edges are symmetrical to each other about the longitudinal axis; and
wherein the plurality of different widths corresponding to the 5 to 20 local maxima and minima or other transition points spaced along each of the first and second edges;
whereby light entering one of the two ports optically coupled to the first region end is substantially equally split into the two ports optically coupled to the second region end.

10. The coupler according to claim 9, wherein each of the plurality of different widths is substantially equal to 1.5 µm+/−10%.

11. The coupler according to claim 10, wherein the two ports coupled to the first region end are spaced apart by a first port gap; wherein the two ports coupled to the second region end are spaced apart by a second port gap; and wherein the first port gap is substantially equal to the second port gap, which is substantially equal to 0.2 pm+/−50%.

12. The coupler according to claim 11, wherein each of the ports coupled to the first and second region ends comprises:
a respective outer port side for optical coupling to an optical waveguide; and
a tapered section with a taper length equal to 1.0 µm+/−50%, a first taper width bordering the multimode interference region equal to 0.7 µm+/−20%, and a second taper width at the outer port side equal to 0.5 µm+/−20%.

13. A method of manufacturing a multimode interference (MMI) coupler comprising:
a multimode interference (MMI) region including:
first and second region ends separated by a region length along a longitudinal axis, and
first and second edges between the first and second region ends, defining the MMI region, which varies in width along the region length, each of the first and second edges includes at least three critical points defining at least three local minima or maxima;
  at least one port optically coupled to the first region end; and
  at least one port optically coupled to the second region end;
said method comprising:
  determining the first and second edges for a predefined set of design parameters, using a computerized optimization algorithm; and
  fabricating the MMI coupler with the first and second edges;
  wherein each of the first and second edges also includes at least one transition point with a change in curvature as the width transitions from a wider width to a narrower width, wherein a second derivative of a slope of the first and second edges at the transition point equals relative to the longitudinal axis is substantially 0.

14. A method of manufacturing a multimode interference (MMI) coupler comprising:
a multimode interference (MMI) region including:
first and second region ends separated by a region length along a longitudinal axis, and
first and second edges between the first and second region ends, defining the MMI region, which varies in width along the region length, each of the first and second edges includes at least three critical points defining at least three local minima or maxima;
  at least one port optically coupled to the first region end; and
  at least one port optically coupled to the second region end;
said method comprising:
  determining the first and second edges for a predefined set of design parameters, using a computerized optimization algorithm; and
  fabricating the MMI coupler with the first and second edges;
  wherein determining the first and second edges comprises:
  a) generating a set of region widths, perpendicular to and spaced apart along the longitudinal axis, corresponding to the plurality of local minima and maxima, using the computerized optimization algorithm, thereby forming first and second interim edges; and
  b) smoothing the first and second interim edges to generate the first and second edges including at least two local minima and at least three local maxima in each of the first and second edges.

15. The method according to claim 14, wherein each of the first and second edges also includes at least one transition point with a change in curvature as the width transitions from a wider width to a narrower width, wherein a second derivative of a slope of the first and second edges at the transition point equals relative to the longitudinal axis is substantially 0.

16. The method according to claim 14, further comprising setting the set of region widths to between 8 to 20 region widths corresponding to between 5 and 20 local maxima and minima.

17. A method of manufacturing a multimode interference (MMI) coupler comprising:
a multimode interference (MMI) region including:
first and second region ends separated by a region length along a longitudinal axis, and
first and second edges between the first and second region ends, defining the MMI region, which varies in width along the region length, each of the first and second edges includes at least three critical points defining at least three local minima or maxima;
  at least one port optically coupled to the first region end; and
  at least one port optically coupled to the second region end;
said method comprising:
  determining the first and second edges for a predefined set of design parameters, using a computerized optimization algorithm; and
  fabricating the MMI coupler with the first and second edges;
wherein determining the first and second edges comprises:
  i) randomly generating a set of interim region widths, perpendicular to and spaced apart along the longitudinal axis, corresponding to the plurality of local minima and maxima, within a predefined widths range approximate to a predefined initial region width, using the computerized optimization algorithm, thereby forming first and second interim edges;
  ii) smoothing the first and second interim edges;
  iii) determining output optical power at each of the ports optically coupled to the second region end relative to a predefined input optical power at one of the ports optically coupled to the first region end, by simulating the MMI coupler for the set of interim widths and the predefined set of design parameters;
  iv) calculating a figure of merit from the output optical powers and the predefined input optical power;
  v) repeating steps i) to iv) until the figure of merit exceeds a predefined performance limit for a working set of interim widths; and
  vi) setting the working set of interim widths as the set of region widths.

18. The method according to claim 17, wherein the step of smoothing the first and second interim edges comprises interpolating the working set of interim widths, using a computerized interpolation algorithm.

19. The method according to claim 17, wherein the computerized optimization algorithm comprises one of a particle swarm optimization algorithm and a genetic optimization algorithm.

20. The method according to claim 17, further comprising setting the predefined widths range to between 80% and 120% of the predefined initial region width.

* * * * *